UNITED STATES PATENT OFFICE.

MARTINUS H. CARON, OF WELTEVREDEN, JAVA, DUTCH EAST INDIES, ASSIGNOR TO RESEARCH CORPORATION, OF NEW YORK, N. Y., A CORPORATION OF NEW YORK.

PROCESS FOR EXTRACTING SILVER FROM ORE.

1,298,454.

Specification of Letters Patent.

Patented Mar. 25, 1919.

No Drawing.

Application filed July 16, 1917. Serial No. 180,834.

*To all whom it may concern:*

Be it known that I, MARTINUS HENDRICUS CARON, residing at Weltevreden, Java, Dutch East Indies, have invented certain new and useful Improvements in Processes for Extracting Silver from Ore; and I hereby declare the following to be a full, clear, and exact description of the invention.

This invention is an improvement upon the process forming the subject of my Patent No. 1,232,216, dated July 3, 1917. As stated in my said patent, it is generally known that with certain kinds of ore containing silver, or silver and gold in addition to a relatively high percentage of manganese dioxid (especially oxidation ore) the amalgamation and cyanidation processes result in a very unsatisfactory silver extraction. This low silver extraction is due to the presence of manganese dioxid, this substance apparently forming insoluble double oxid compounds with silver, or otherwise being associated in such a way as to prevent normal action of mercury or cyanid on the said silver compounds.

The object of the present invention is to provide an improved process by which this objection is overcome. In this process, the ore after being crushed is first subjected to a reducing roast, by means of producer gas, water gas, wood gas or any other generator gas or reducing agent, and this may be done either by directly heating the ore in this reducing atmosphere, or by first heating the ore to the proper temperature, by which a part of the oxygen of the $MnO_2$ is liberated by disassociation, after which it must be reduced by the gases to MnO. The principal thing in this reduction by means of $CO, H_2$, $(C_xH_y)$, etc., is that $MnO_2$ should be completely reduced to MnO, all the insoluble silver compounds simultaneously being reduced to metallic silver. The temperature at which a complete reduction to MnO and metallic silver is obtained may vary. I prefer a temperature between 600° C. and 800° C. according to the nature of the ore. If the temperature is increased above 800° C. up to 1000° C. or still higher, extraction by amalgamation will be increased considerably but not the extraction by cyanid. In some cases even temperatures below 600° C. may prove to be sufficient, say down to 350° C. After the said complete reduction to MnO and Ag it is very important to prevent reoxidation of the MnO, as this lowest oxid of manganese, when still hot, is very liable to take up oxygen, passing into higher oxid compounds of manganese, which associate again with the newly formed fine silver particles and thus form insoluble silver manganese compounds.

Hence this reoxidation must be prevented and this may be obtained by cooling the ore completely in reducing gas, or by cooling the hot ore suddenly in water, out of contact with air, or in any other way which excludes oxygen from access to the hot ore.

After the aforesaid treatment, the refractory manganese silver ore is changed into a free milling silver ore and any suitable process for the extraction of the silver may be used.

To sum up, my present invention comprises an improvement in the method of extracting silver from ore containing manganese dioxid in addition to silver or silver and gold, said improvement consisting in (*a*) A complete reduction of the $MnO_2$ and the insoluble silver compounds to MnO and metallic silver by means of a reducing roast at suitable temperatures, and (*b*) A cooling of the hot reduced ore in such a way as to prevent reoxidation of the newly formed MnO and Ag. This may be effected by cooling the ore in reducing gas or in water, so as to prevent access of air, or in any other suitable way which prevents reoxidation. After said preparatory treatment the refractory manganese silver ore is changed into a free milling silver ore and may be extracted by amalgamation, cyanidation, flotation or any other suitable method.

I claim:

1. Process of recovering values from ores containing manganese dioxid, comprising subjecting the ore to a preparatory reducing roast, cooling the reduced ore under non-oxidizing conditions, and recovering the values from the reduced ore by methods applicable to free-milling ores.

2. Process of recovering values from ores containing manganese dioxid, comprising subjecting the ore to a preparatory reducing roast, cooling the reduced ore under reducing conditions, and recovering the values from the reduced ore by methods applicable to free-milling ores.

3. Process of recovering values from ores containing manganese dioxid, comprising heating the ore to a temperature sufficient to eliminate a portion of the oxygen of the manganese dioxid, subjecting the heated ore to the action of a gaseous reducing agent to effect a further reduction thereof, cooling the reduced ore under non-oxidizing conditions and recovering the values from the reduced ore by methods applicable to free-milling ores.

In testimony whereof I have signed my name to this specification.

MARTINUS H. CARON.